(12) United States Patent
Larsson et al.

(10) Patent No.: US 10,807,081 B2
(45) Date of Patent: Oct. 20, 2020

(54) AMMONIA SLIP CATALYST DESIGNED TO BE FIRST IN AN SCR SYSTEM

(71) Applicant: Johnson Matthey Public Limited Company, London (GB)

(72) Inventors: Mikael Larsson, Gothenburg (SE); David Micallef, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 16/272,002

(22) Filed: Feb. 11, 2019

(65) Prior Publication Data

US 2019/0168198 A1 Jun. 6, 2019

Related U.S. Application Data

(63) Continuation of application No. 15/184,055, filed on Jun. 16, 2016, now Pat. No. 10,201,807.

(Continued)

(51) Int. Cl.
*B01J 23/42* (2006.01)
*B01J 23/44* (2006.01)
(Continued)

(52) U.S. Cl.
CPC ........ *B01J 29/763* (2013.01); *B01D 53/9418* (2013.01); *B01D 53/9436* (2013.01); *B01D 53/9472* (2013.01); *B01J 21/04* (2013.01); *B01J 23/42* (2013.01); *B01J 23/44* (2013.01); *B01J 35/0006* (2013.01); *B01J 35/04* (2013.01);
(Continued)

(58) Field of Classification Search
CPC . B01J 29/763; B01J 23/42; B01J 21/04; B01J 35/0006; B01J 23/44; B01J 35/04; B01D 53/9418; B01D 53/9436; B01D 53/9472; B01D 2255/2092; B01D 2255/9037; B01D 2255/915; B01D 2255/1023; B01D 2255/50;
(Continued)

(56) References Cited

U.S. PATENT DOCUMENTS 5,496,788 A 3/1996 Domesle et al.
7,879,759 B2 2/2011 Augustine et al.
(Continued)

FOREIGN PATENT DOCUMENTS

EP 2426326 A1 3/2012
WO 2012166833 A1 12/2012
(Continued)

*Primary Examiner* — Haytham Soliman

(57) ABSTRACT

Catalyst articles having an ammonia slip catalyst (ASC) comprising a blend of platinum on a support with low ammonia storage and a first SCR catalyst, and a second catalyst, such as a diesel oxidation catalyst, a diesel exotherm catalyst (DEC), a NOx absorber, a selective catalytic reduction/passive NOx adsorber (SCR/PNA), a cold-start catalyst (CSC) or a three-way catalyst (TWC) are disclosed. The catalyst articles can also contain one or two additional SCR catalysts. The catalysts can be present in one of various configurations. The catalytic articles are useful for selective catalytic reduction (SCR) of NOx in exhaust gases and in reducing the amount of ammonia slip. Methods of using the catalytic articles in an SCR process, where the amount of ammonia slip is reduced, are also described.

16 Claims, 11 Drawing Sheets

Related U.S. Application Data

(60) Provisional application No. 62/181,271, filed on Jun. 18, 2015.

(51) Int. Cl.
  *B01J 29/76* (2006.01)
  *B01D 53/94* (2006.01)
  *B01J 21/04* (2006.01)
  *B01J 35/00* (2006.01)
  *B01J 35/04* (2006.01)

(52) U.S. Cl.
  CPC .......... *B01D 2255/1021* (2013.01); *B01D 2255/1023* (2013.01); *B01D 2255/2092* (2013.01); *B01D 2255/50* (2013.01); *B01D 2255/9037* (2013.01); *B01D 2255/915* (2013.01); *Y02C 20/10* (2013.01); *Y02T 10/22* (2013.01); *Y02T 10/24* (2013.01)

(58) Field of Classification Search
  CPC . B01D 2255/1021; Y02C 20/10; Y02T 10/22; Y02T 10/24
  USPC .......................................................... 502/339
  See application file for complete search history.

(56) References Cited

U.S. PATENT DOCUMENTS

| | | |
|---|---|---|
| 9,145,809 B2 | 9/2015 | Boorse |
| 2010/0175372 A1 | 7/2010 | Lambert et al. |
| 2011/0286900 A1 | 11/2011 | Caudle |
| 2012/0328499 A1 | 12/2012 | Ando et al. |
| 2014/0147359 A1* | 5/2014 | Bergeal ............ B01D 53/945 423/213.5 |
| 2015/0037233 A1* | 2/2015 | Fedeyko ............ B01D 53/8628 423/239.1 |

FOREIGN PATENT DOCUMENTS

| | | |
|---|---|---|
| WO | 2012170421 A1 | 12/2012 |
| WO | 2013050964 A1 | 4/2013 |

\* cited by examiner

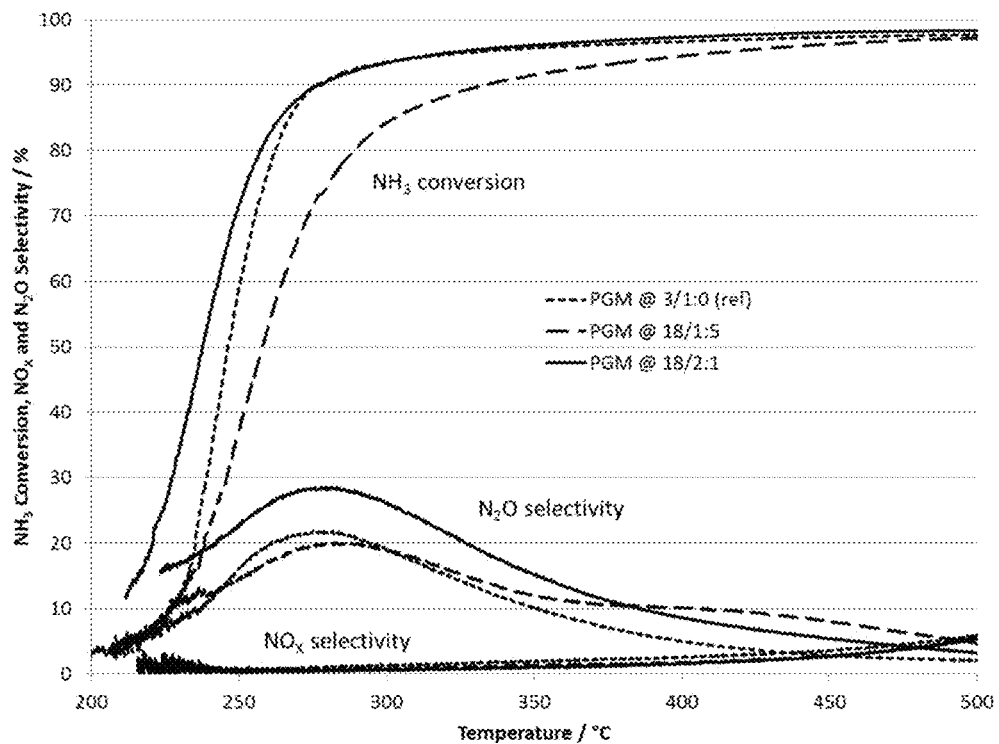
Fig. 10 - Fresh
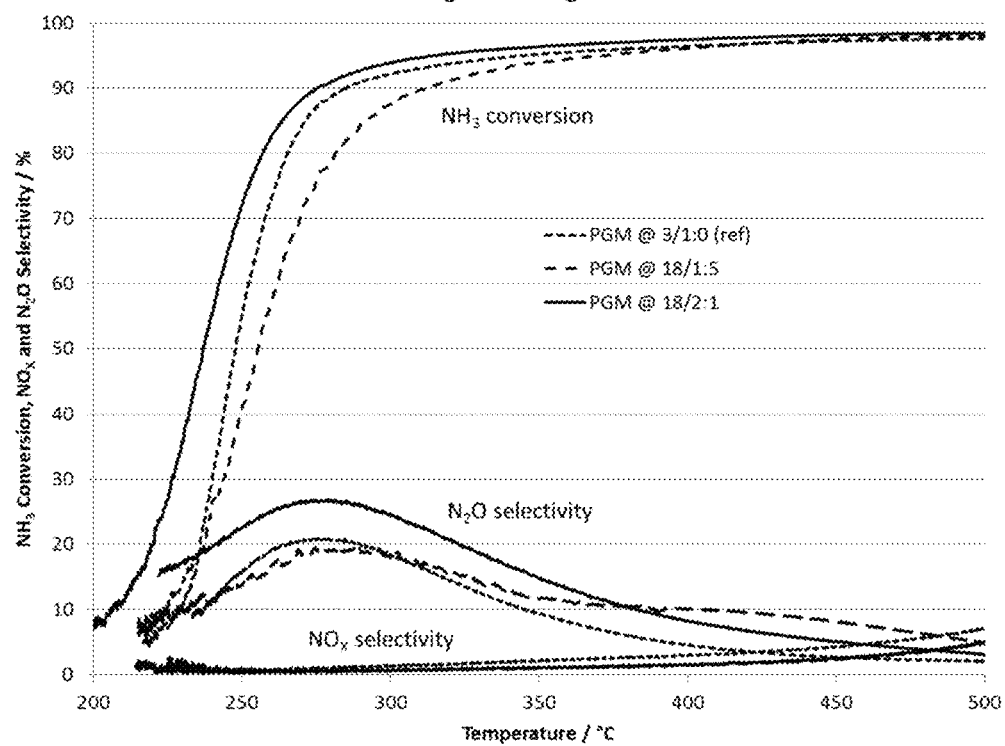
Fig. 11 - Aged

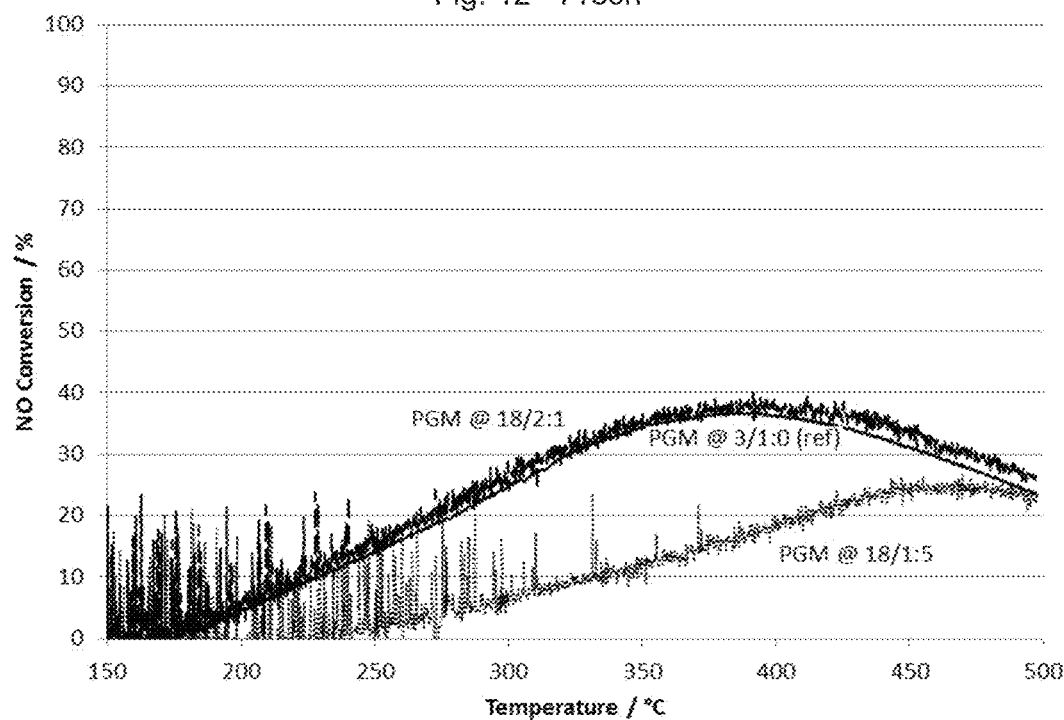
Fig. 12 - Fresh
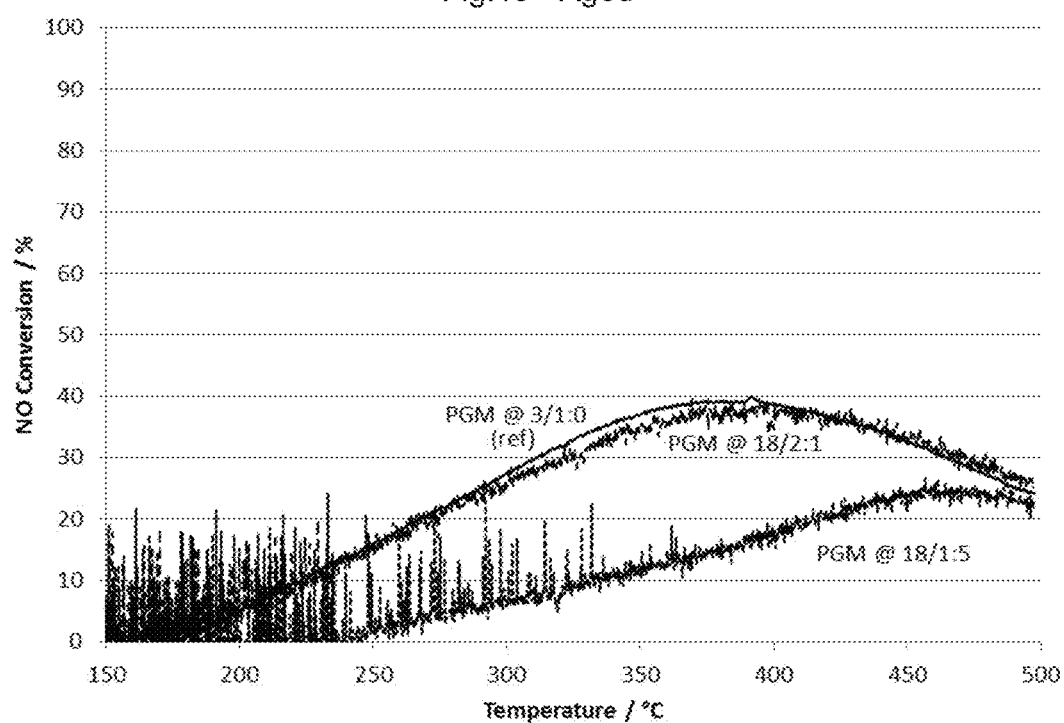
Fig. 13 - Aged

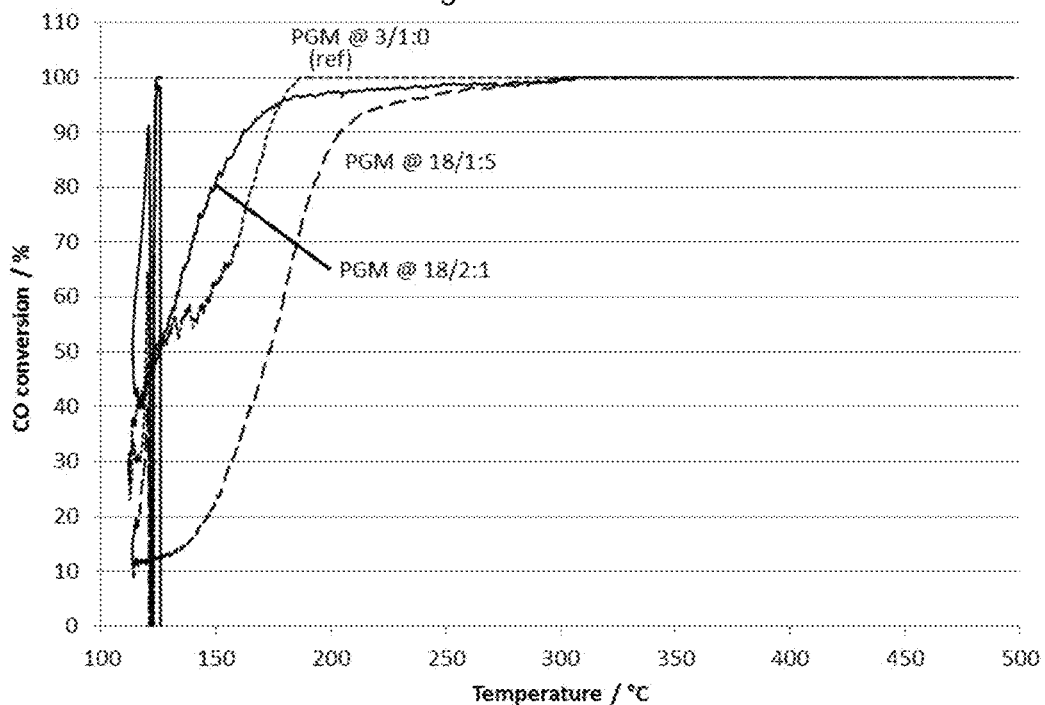
Fig. 14. - Fresh
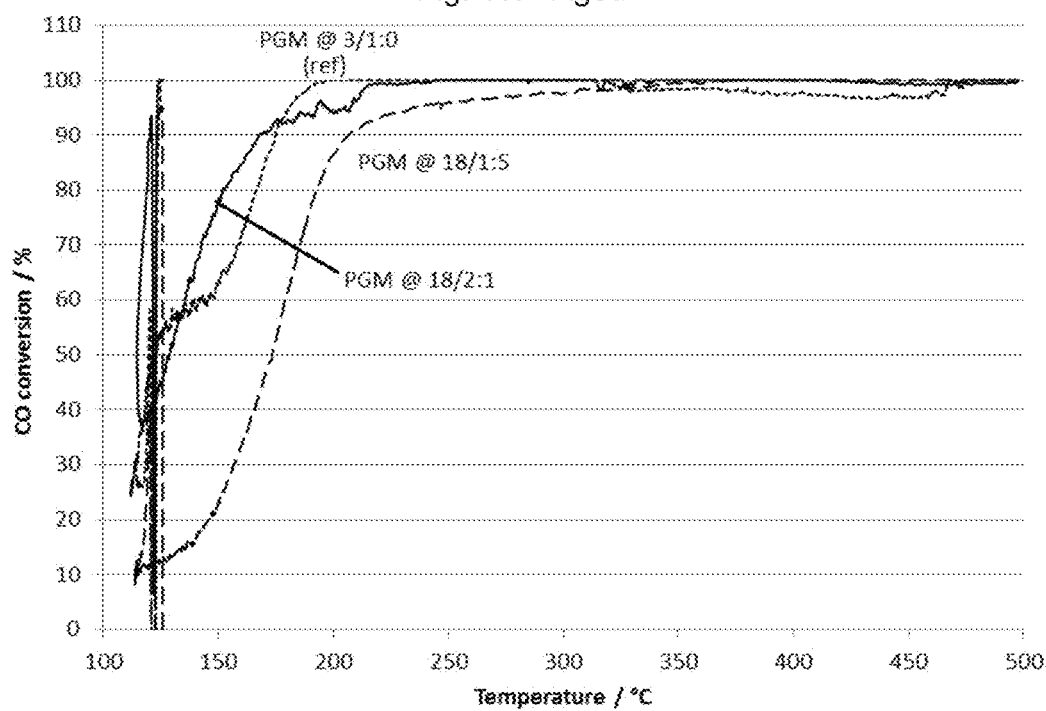
Fig. 15. - Aged

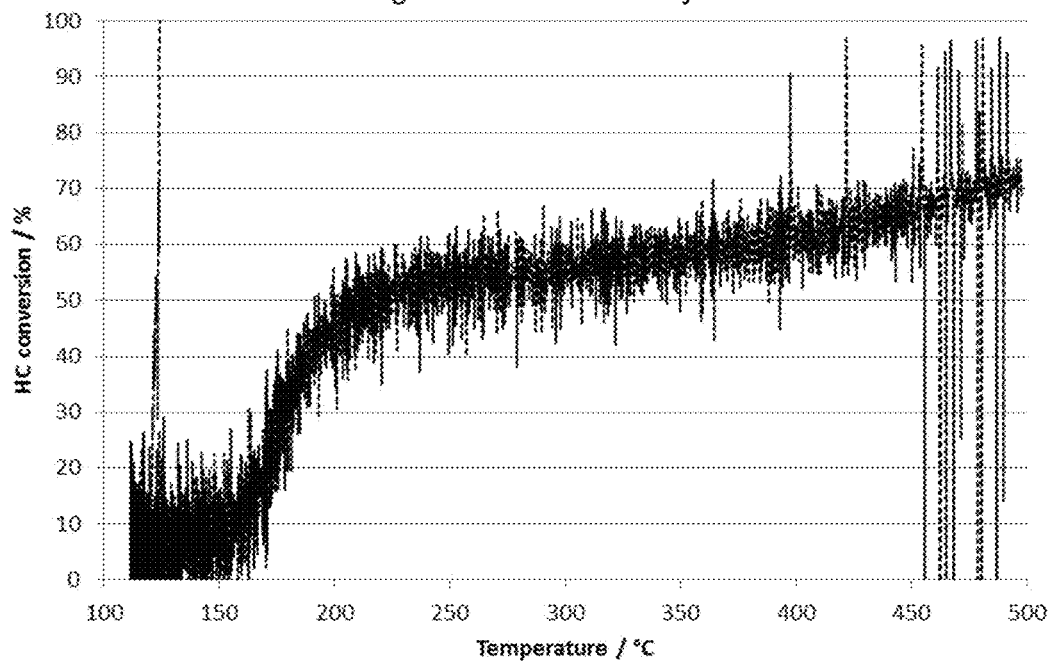
Fig. 16. - Fresh Pt only
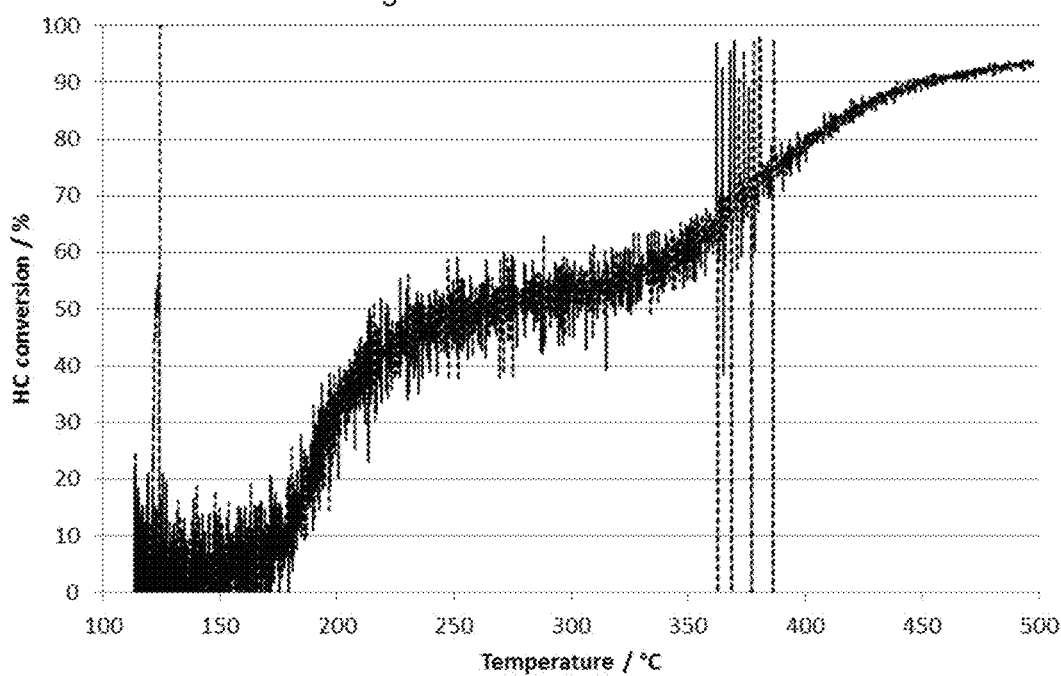
Fig. 17. - Fresh 1:5 Pt:Pd

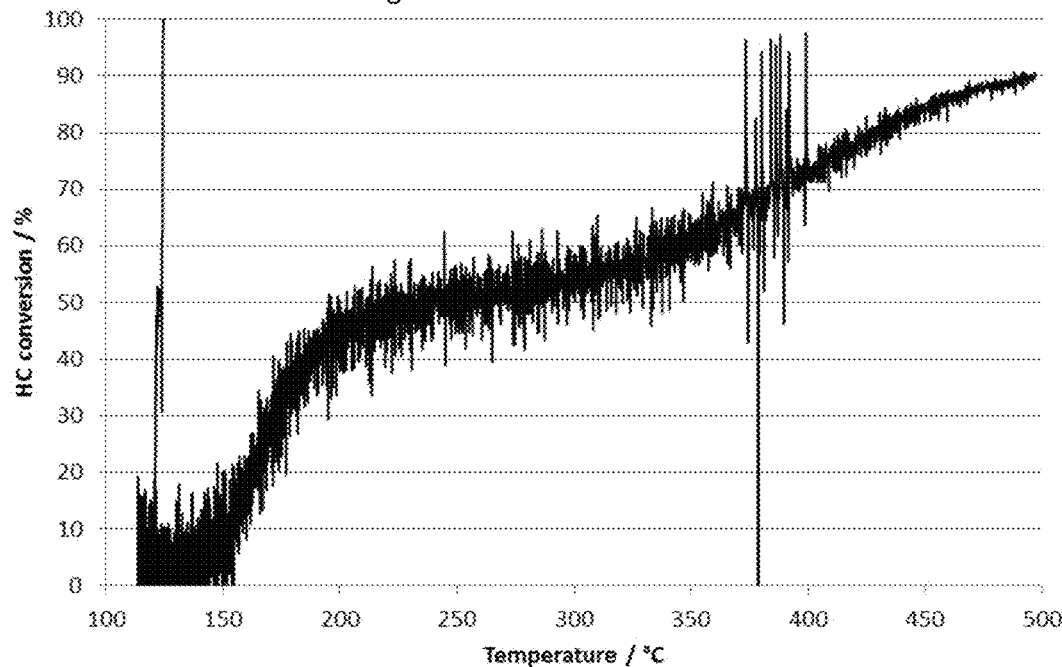
Fig. 18. - Fresh 2:1 Pt:Pd
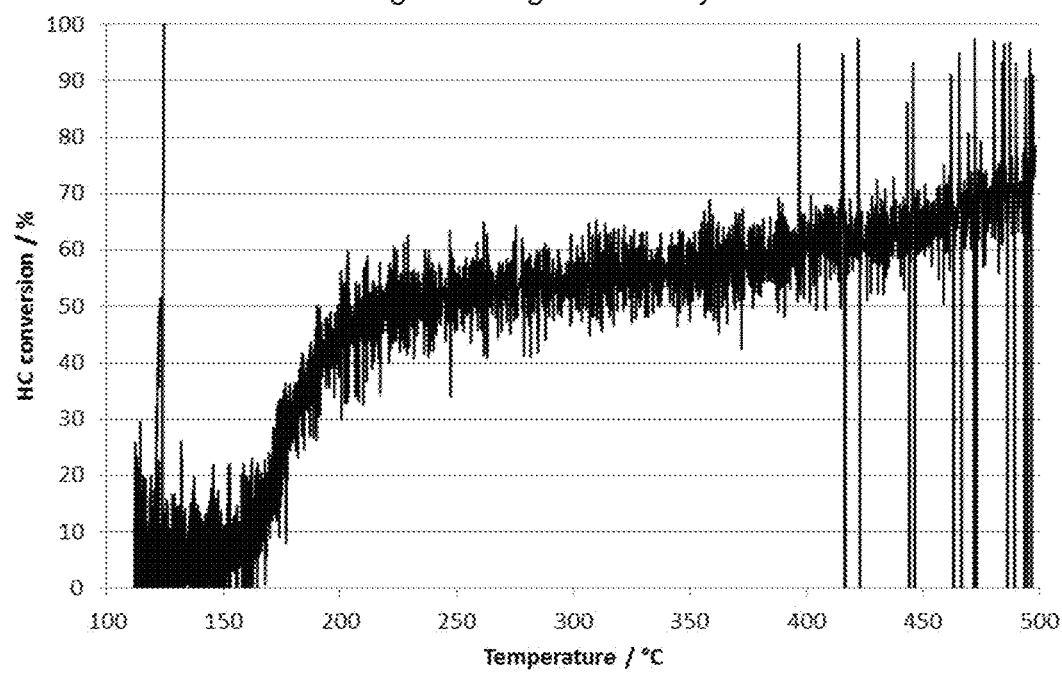
Fig. 19. – Aged – Pt only

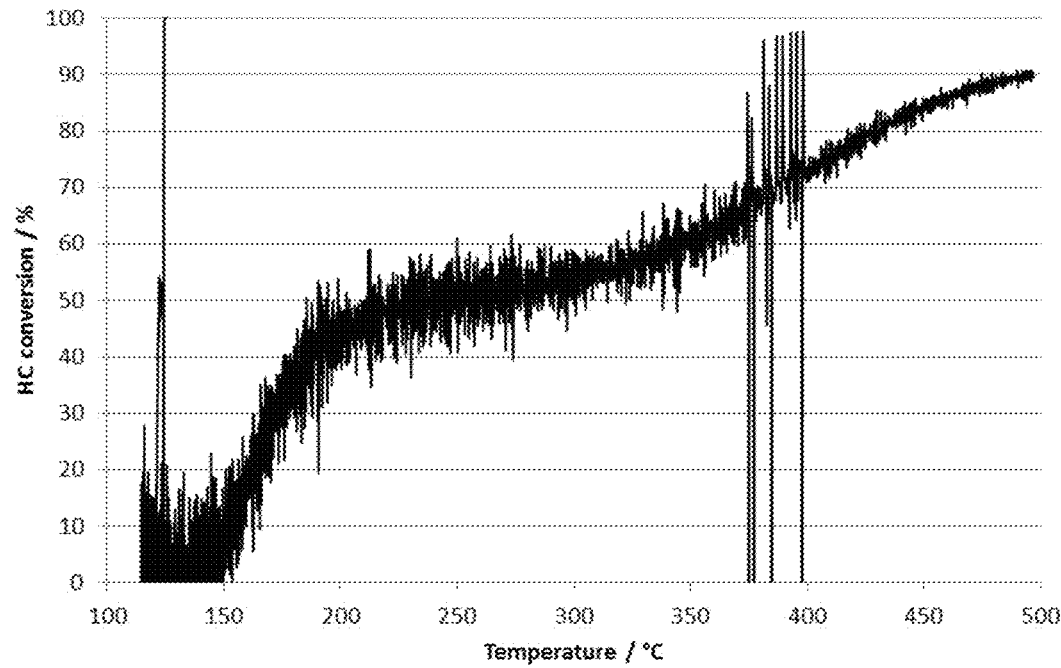
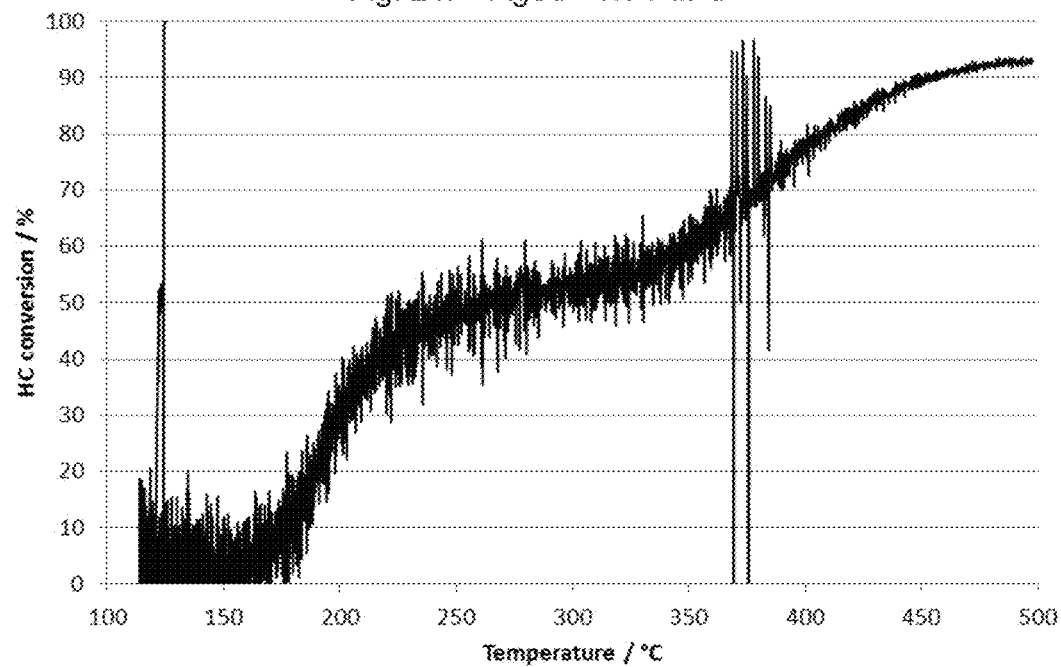

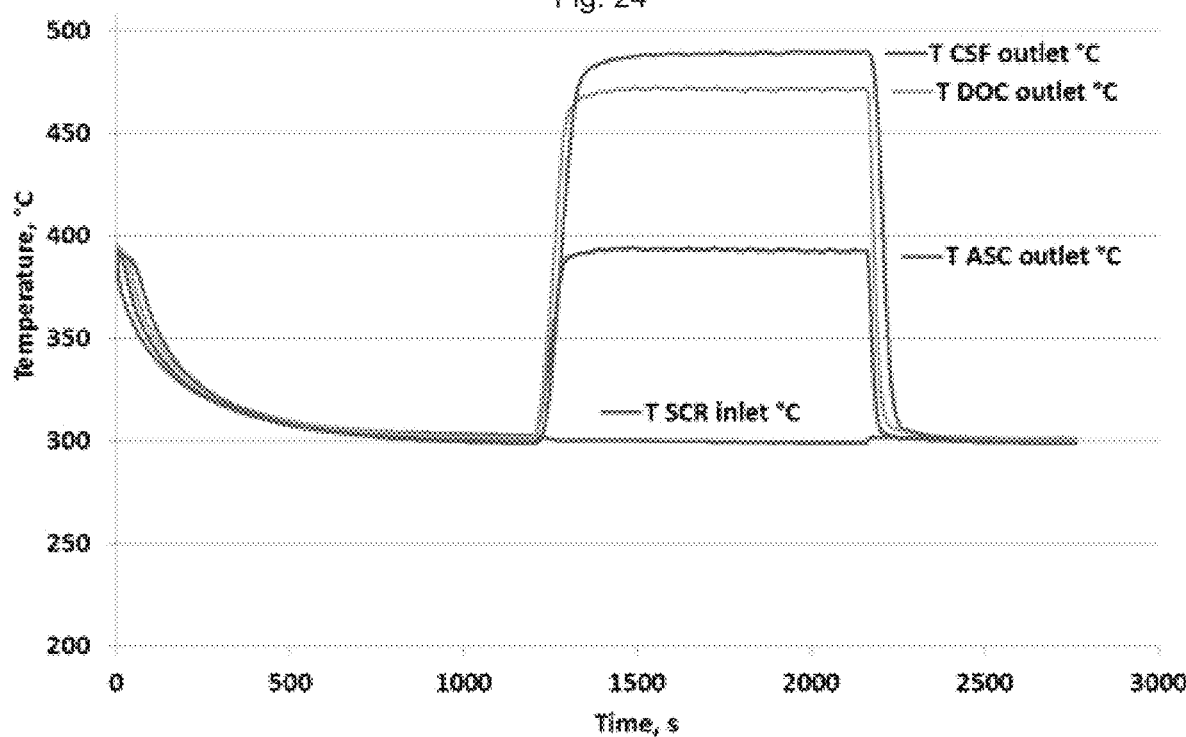

AMMONIA SLIP CATALYST DESIGNED TO BE FIRST IN AN SCR SYSTEM

FIELD OF THE INVENTION

The invention relates to ammonia slip catalysts (ASC), articles containing ammonia slip catalysts and methods of manufacturing and using such articles to reduce ammonia slip.

BACKGROUND OF THE INVENTION

Hydrocarbon combustion in diesel engines, stationary gas turbines, and other systems generates exhaust gas that must be treated to remove nitrogen oxides (NOx), which comprises NO (nitric oxide) and $NO_2$ (nitrogen dioxide), with NO being the majority of the NOx formed. NOx is known to cause a number of health issues in people as well as causing a number of detrimental environmental effects including the formation of smog and acid rain. To mitigate both the human and environmental impact from $NO_x$ in exhaust gas, it is desirable to eliminate these undesirable components, preferably by a process that does not generate other noxious or toxic substances.

Exhaust gas generated in lean-burn and diesel engines is generally oxidative. NOx needs to be reduced selectively with a catalyst and a reductant in a process known as selective catalytic reduction (SCR) that converts NOx into elemental nitrogen ($N_2$) and water. In an SCR process, a gaseous reductant, typically anhydrous ammonia, aqueous ammonia, or urea, is added to an exhaust gas stream prior to the exhaust gas contacting the catalyst. The reductant is absorbed onto the catalyst and the $NO_x$ is reduced as the gases pass through or over the catalyzed substrate. In order to maximize the conversion of NOx, it is often necessary to add more than a stoichiometric amount of ammonia to the gas stream. However, release of the excess ammonia into the atmosphere would be detrimental to the health of people and to the environment. In addition, ammonia is caustic, especially in its aqueous form. Condensation of ammonia and water in regions of the exhaust line downstream of the exhaust catalysts can result in a corrosive mixture that can damage the exhaust system. Therefore the release of ammonia in exhaust gas should be eliminated. In many conventional exhaust systems, an ammonia oxidation catalyst (also known as an ammonia slip catalyst or "ASC") is installed downstream of the SCR catalyst to remove ammonia from the exhaust gas by converting it to nitrogen. The use of ammonia slip catalysts can allow for $NO_x$ conversions of greater than 90% over a typical diesel driving cycle.

It would be desirable to have a catalyst that provides for both NOx removal by SCR and for selective ammonia conversion to nitrogen, where ammonia conversion occurs over a wide range of temperatures in a vehicle's driving cycle, and minimal nitrogen oxide and nitrous oxide byproducts are formed.

SUMMARY OF THE INVENTION

In a first aspect, the invention relates to a catalyst article comprising a substrate comprising an inlet end and an outlet end, a first zone and a second zone, where the first zone comprises an ammonia slip catalyst (ASC) comprising a platinum group metal and a first SCR catalyst comprising a metal exchange molecular sieve, vanadium or a base metal, and the second zone comprises a second catalyst selected from the group consisting of a diesel oxidation catalyst (DOC), a diesel exotherm catalyst (DEC), a catalyzed soot filter (CSF), a NOx absorber, a selective catalytic reduction/passive NOx adsorber (SCR/PNA), a cold-start catalyst (CSC) or a three-way catalyst (TWC), where the first zone is located upstream of the gas flow relative to the second zone.

In another aspect, the invention relates to exhaust systems comprising a catalytic article of the first aspect of the invention and a means for forming $NH_3$ in the exhaust gas.

In yet another aspect, the invention relates to a combustion source comprising an exhaust system comprising a catalyst article of the first aspect of the invention and a means for forming $NH_3$ in the exhaust gas In still another aspect, the invention relates to a method of providing an exotherm in a catalyst where the method comprises contacting an exhaust gas comprising hydrocarbons with the catalyst of the first aspect of the invention.

In another aspect, the invention relates to a method of reducing $N_2O$ formation from $NH_3$ in an exhaust gas, where the method comprises contacting an exhaust gas comprising ammonia with a catalyst article of the first aspect of the invention.

BRIEF DESCRIPTION OF THE DRAWINGS

FIG. 10 is a graph showing $NH_3$ conversion, $N_2O$ selectivity and NOx selectivity using fresh catalysts.

FIG. 11 is a graph showing $NH_3$ conversion, $N_2O$ selectivity and NOx selectivity using aged catalysts.

FIG. 12 is a graph showing NO conversion using fresh catalysts.

FIG. 13 is a graph showing NO conversion using aged catalysts.

FIG. 14 is a graph showing CO conversion using fresh catalysts.

FIG. 15 is a graph showing CO conversion using aged catalysts.

FIG. 16 is a graph showing hydrocarbon (HC) conversion using a fresh reference catalyst.

FIG. 17 is a graph showing hydrocarbon (HC) conversion using a fresh catalyst having a 1:5 Pt:Pd ratio.

FIG. 18 is a graph showing hydrocarbon (HC) conversion using a fresh catalyst having a 2:1 Pt:Pd ratio.

FIG. 19 is a graph showing hydrocarbon (HC) conversion using an aged reference catalyst.

FIG. 20 is a graph showing hydrocarbon (HC) conversion using an aged catalyst having a 1:5 Pt:Pd ratio.

FIG. 21 is a graph showing hydrocarbon (HC) conversion using an aged catalyst having a 2:1 Pt:Pd ratio.

FIG. 24 is a graph showing the temperature at various points in an exhaust system containing a reference catalyst with Pt and Pd in a 2:1 loading.

DETAILED DESCRIPTION OF THE INVENTION

Figure 1:
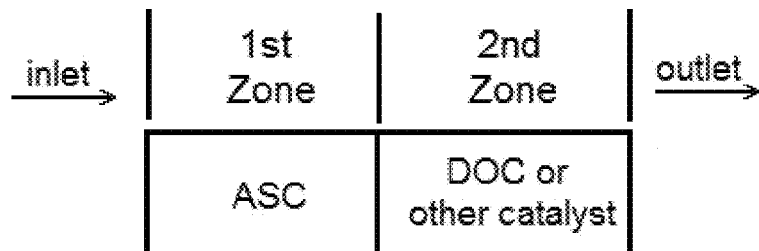
FIG. 1 depicts a configuration in which the ASC is positioned in the exhaust gas flow before a DOC or other catalyst.

As used in this specification and the appended claims, the singular forms "a", "an" and "the" include plural referents unless the context clearly indicates otherwise. Thus, for example, reference to "a catalyst" includes a mixture of two or more catalysts, and the like.

The term "ammonia slip", means the amount of unreacted ammonia that passes through the SCR catalyst.

The term "support" means the material to which a catalyst is fixed.

The term "a support with low ammonia storage" means a support that stores less than 0.001 mmol $NH_3$ per $m^3$ of support. The support with low ammonia storage is preferably a molecular sieve or zeolite having a framework type selected from the group consisting of AEI, ANA, ATS, BEA, CDO, CFI, CHA, CON, DDR, ERI, FAU, FER, GON, IFR, IFW, IFY, IHW, IMF, IRN, IRY, ISV, ITE, ITG, ITN, ITR, ITW, IWR, IWS, IWV, IWW, JOZ, LTA, LTF, MEL, MEP, MFI, MRE, MSE, MTF, MTN, MTT, MTW, MVY, MWW, NON, NSI, RRO, RSN, RTE, RTH, RUT, RWR, SEW, SFE, SFF, SFG, SFH, SFN, SFS, SFV, SGT, SOD, SSF, SSO, SSY, STF, STO, STT, SVR, SVV, TON, TUN, UOS, UOV, UTL, UWY, VET, VNI. More preferably, the molecular sieve or zeolite has a framework type selected from the group consisting of BEA, CDO, CON, FAU, MEL, MFI and MWW, even more preferably the framework type is selected from the group consisting of BEA and MFI.

The term "calcine", or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

The term "about" means approximately and refers to a range that is optionally ±25%, preferably ±10%, more preferably, ±5%, or most preferably ±1% of the value with which the term is associated.

When a range, or ranges, for various numerical elements are provided, the range, or ranges, can include the values, unless otherwise specified.

The term "$N_2$ selectivity" means the percent conversion of ammonia into nitrogen.

The terms "diesel oxidation catalyst" (DOC), "diesel exotherm catalyst" (DEC), "NOx absorber", "SCR/PNA" (selective catalytic reduction/passive NOx adsorber), "cold-start catalyst" (CSC) and "three-way catalyst" (TWC) are well known terms in the art used to describe various types of catalysts used to treat exhaust gases from combustion processes.

The term "platinum group metal" or "PGM" refers to platinum, palladium, ruthenium, rhodium, osmium and iridium. The platinum group metals are preferably platinum, palladium, ruthenium or rhodium.

The terms "downstream" and "upstream" describe the orientation of a catalyst or substrate where the flow of exhaust gas is from the inlet end to the outlet end of the substrate or article.

In the first aspect of the invention, a catalyst article comprises a substrate comprising an inlet end and an outlet end, a first zone and a second zone, where the first zone comprises an ammonia slip catalyst (ASC) comprising a platinum group metal and a first SCR catalyst comprising a metal exchange molecular sieve, vanadium or a base metal, and the second zone comprises a second catalyst selected from the group consisting of a diesel oxidation catalyst (DOC), a diesel exotherm catalyst (DEC), a catalyzed soot filter (CSF), a NOx absorber, a selective catalytic reduction/ passive NOx adsorber (SCR/PNA), a cold-start catalyst (CSC) or a three-way catalyst (TWC), where the first zone is located upstream of the gas flow relative to the second zone.

The ammonia slip catalyst comprises an ammonia oxidation catalyst comprising a platinum group metal and a first SCR catalyst comprising a metal exchange molecular sieve, vanadium, a base metal, a base metal oxide or a mixed oxide. The PGM catalyst and the SCR catalyst can be present in one of four configurations: three types of bi-layer configurations and a blend. The first bi-layer configuration has the ammonia oxidation catalyst in a bottom layer and an SCR catalyst in the top layer. The second bi-layer configuration has the SCR catalyst in a layer before a layer comprising the ammonia oxidation catalyst. The third bi-layer configuration has the SCR catalyst in a layer before a layer comprising the ammonia oxidation catalyst and a portion of the SCR catalyst is also present in a top layer over the ammonia oxidation catalyst. These bi-layer configurations can be depicted as:

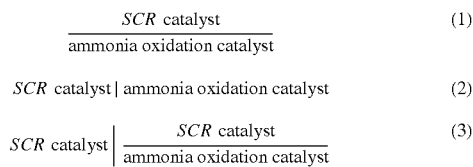

$$\frac{SCR\ catalyst}{ammonia\ oxidation\ catalyst} \quad (1)$$

$$SCR\ catalyst\ |\ ammonia\ oxidation\ catalyst \quad (2)$$

$$SCR\ catalyst\ \Big|\ \frac{SCR\ catalyst}{ammonia\ oxidation\ catalyst} \quad (3)$$

In each of these configurations, the layer with the SCR catalyst can also include a platinum group metal, preferably platinum or palladium, more preferably palladium. The ammonia slip catalyst can comprises a bottom layer comprising a platinum group metal and a top layer comprising the first SCR catalyst located over the bottom layer.

In the fourth configuration, the ammonia slip catalyst comprises a blend of a platinum group metal (PGM) on a support with low ammonia storage and a first SCR catalyst. Preferably, the platinum group metal comprises platinum, palladium or a mixture thereof. The blend can further comprise Pd, Nb—Ce—Zr or Nb on $MnO_2$.

When the article comprises two or more ASCs, the ammonia oxidation catalyst and the SCR catalyst in the ASCs can be the same or different.

The first zone and the second zone can be located on the same substrate where the first zone is located on the inlet side of the substrate and the second zone is located on the outlet side of the substrate. The catalyst article can further comprise a second substrate, where the first zone is located on a first substrate and the second zone is located on the second substrate and the first substrate is located upstream of the second substrate. The catalyst article can comprise a first piece and a second piece, where the first zone is located in the first piece and the second zone is located in the second piece and the first piece is located upstream of the second piece. The catalyst article can comprise a first piece and a second piece, where a portion of the first zone is located in the first piece and the remainder of the first zone and the second zone is located in the second piece and the first piece is located upstream of the second piece. The catalyst article can comprise a three first piece and a second piece, where the first zone is located in the first piece and the remainder of the first zone and the second zone is located in the second piece and the first piece is located upstream of the second piece. In each of these combinations of pieces, additional catalysts can also be place in the second piece or on additional pieces after the second piece.

The amount of PGM in the ASC can vary depending upon the composition of the catalyst article. For example, the PGM can be present at levels of from about 0.1 g/ft³ to about 5 g/ft³, preferably from about 0.1 g/ft³ to about 1 g/ft³. In some configurations, when it is desirable to generate an exotherm, PGM can be present at levels of from about 1 g/ft³ to about 20 g/ft³, preferably from about 5 g/ft³ to about 10 g/ft³. In some configurations the PGM is Pt, Pd or a combination of platinum and palladium. When both Pt and Pd are used, the ratio of Pt:Pd can be between about 10:1 and 1:100, preferably from between about 5:1 and 1:10.

The ammonia oxidation catalyst can comprise platinum on a support with low ammonia storage. The support with low ammonia storage can be a siliceous support. The siliceous support can comprise a silica or a zeolite with a silica-to-alumina ratio of at least one of: (a) at least 100, (b) at least 200, (c) at least 250, (d) at least 300, (e) at least 400, (f) at least 500, (g) at least 750 and (h) at least 1000. The siliceous support can comprise a molecular sieve having a BEA, CDO, CON, FAU, MEL, MFI or MWW Framework Type. The ratio of the amount of the SCR catalyst to the amount of platinum on the support with low ammonia storage can be in the range of 0:1 to 300:1, preferably 3:1 to 300:1, more preferably 7:1 to 100:1 and most preferably 10:1 to 50:1, including each of the end-points in the ratio, based on the weight of these components.

The second zone can comprise a blend of an oxidation catalyst and a second SCR catalyst.

The catalytic article can further comprise a second SCR catalyst, where the second SCR catalyst is located either upstream of the ammonia slip catalyst or between the ammonia slip catalyst and the second catalyst. A portion of the second SCR catalyst can at least partially overlap the ammonia slip catalyst.

The catalytic article can comprise a second SCR catalyst, where the second SCR catalyst is located between the ammonia oxidation catalyst and the second catalyst (i.e. downstream of an ASC and upstream of a diesel oxidation catalyst (DOC), a diesel exotherm catalyst (DEC), a catalyzed soot filter (CSF), a NOx absorber, a selective catalytic reduction/passive NOx adsorber (SCR/PNA), a cold-start catalyst (CSC) or a three-way catalyst (TWC).)

SCR Catalysts

The catalyst article can comprise one or more SCR catalysts. The SCR catalyst present in each of the ammonia slip catalyst is called a first SCR catalyst. This SCR catalyst is present in the ASC as part of a bi-layer or in a blend with Pt on a support with low ammonia storage. The first SCR catalyst can be a metal exchange molecular sieve, vanadium or a base metal. The first SCR catalyst is preferably a Cu—SCR catalyst, a Fe—SCR catalyst or a mixed oxide, more preferably a Cu—SCR catalyst or a mixed oxide. The Cu—SCR catalyst comprises copper and a molecular sieve. The Fe—SCR catalyst comprises iron and a molecular sieve. Molecular sieves are further described below. Copper or iron can be located within the framework of the molecular sieve and/or in extra-framework (exchangeable) sites within the molecular sieve. The first SCR catalyst is preferably a Cu—SCR catalyst comprising copper and a small pore molecular sieve or an Fe—SCR catalyst comprising iron and a small pore molecular sieve. The small pore molecular sieve can be an aluminosilicate, an aluminophosphate (AlPO), a silico-aluminophosphate (SAPO), or mixtures thereof. The small pore molecular sieve can be selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, and mixtures and/or intergrowths thereof. Preferably, the small pore molecular sieve can be selected from the group of Framework Types consisting of CHA, LEV, AEI, AFX, ERI, SFW, KFI, DDR and ITE. The ratio of the amount of the first SCR catalyst to the amount of platinum on the support with low ammonia storage can be in the range of at least one of: (a) 0:1 to 300:1, (b) 3:1 to 300:1, (c) 7:1 to 100:1; and (d) 10:1 to 50:1, inclusive, based on the weight of these components. Platinum can be present from at least one of: (a) 0.01-0.3 wt. %, (b) 0.03-0.2 wt. %, (c) 0.05-0.17 wt. %, and (d) 0.07-0.15 wt. %, inclusive, relative to the weight of the support of platinum+the weight of platinum+ the weight of the first SCR catalyst in the blend.

A second SCR catalyst can be a base metal, an oxide of a base metal, a molecular sieve, a metal exchanged molecular sieve or a mixture thereof. The base metal can be selected from the group consisting of vanadium (V), molybdenum (Mo), tungsten (W), chromium (Cr), cerium (Ce), manganese (Mn), iron (Fe), cobalt (Co), nickel (Ni), copper (Cu), and zirconium (Zr) and mixtures thereof. SCR compositions consisting of vanadium supported on a refractory metal oxide such as alumina, silica, zirconia, titania, ceria and combinations thereof are well known and widely used commercially in mobile applications. Typical compositions are described in U.S. Pat. Nos. 4,010,238 and 4,085,193, the entire contents of which are incorporated herein by reference. Compositions used commercially, especially in mobile applications, comprise $TiO_2$ on to which $WO_3$ and $V_2O_5$ have been dispersed at concentrations ranging from 5 to 20 wt. % and 0.5 to 6 wt. %, respectively. The second SCR catalyst can comprise Nb—Ce—Zr or Nb on $MnO_2$. These catalysts may contain other inorganic materials such as $SiO_2$ and $ZrO_2$ acting as binders and promoters.

When the SCR catalyst is a base metal, the catalyst article can further comprise at least one base metal promoter. As used herein, a "promoter" is understood to mean a substance that when added into a catalyst, increases the activity of the catalyst. The base metal promoter can be in the form of a metal, an oxide of the metal, or a mixture thereof. The at least one base metal catalyst promoter may be selected from neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), strontium (Sr) and oxides thereof. The at least one base metal catalyst promoter can preferably be $MnO_2$, $Mn_2O_3$, $Fe_2O_3$, $SnO_2$, CuO, CoO, $CeO_2$ and mixtures thereof. The at least one base metal catalyst promoter may be added to the catalyst in the form of a salt in an aqueous solution, such as a nitrate or an acetate. The at least one base metal catalyst promoter and at least one base metal catalyst, e.g., copper, may be impregnated from an aqueous solution onto the oxide support material(s), may be added into a washcoat comprising the oxide support material(s), or may be impregnated into a support previously coated with the washcoat.

The SCR catalyst can comprises a molecular sieve or a metal exchanged molecular sieve. As is used herein "molecular sieve" is understood to mean a metastable material containing tiny pores of a precise and uniform size that may be used as an adsorbent for gases or liquids. The molecules which are small enough to pass through the pores are adsorbed while the larger molecules are not. The molecular sieve can be a zeolitic molecular sieve, a non-zeolitic molecular sieve, or a mixture thereof.

A zeolitic molecular sieve is a microporous aluminosilicate having any one of the framework structures listed in the Database of Zeolite Structures published by the International Zeolite Association (IZA). The framework structures include, but are not limited to those of the CHA, FAU, BEA, MFI, MOR types. Non-limiting examples of zeolites having these structures include chabazite, faujasite, zeolite Y, ultrastable zeolite Y, beta zeolite, mordenite, silicalite, zeolite X, and ZSM-5. Aluminosilicate zeolites can have a silica/alumina molar ratio (SAR) defined as $SiO_2/Al_2O_3$) from at least about 5, preferably at least about 20, with useful ranges of from about 10 to 200.

Any of the SCR catalysts can comprise a small pore, a medium pore or a large pore molecular sieve, or combinations thereof. A "small pore molecular sieve" is a molecular sieve containing a maximum ring size of 8 tetrahedral atoms. A "medium pore molecular sieve" is a molecular sieve containing a maximum ring size of 10 tetrahedral atoms. A "large pore molecular sieve" is a molecular sieve having a maximum ring size of 12 tetrahedral atoms. The second SCR catalyst can comprise a small pore molecular sieve selected from the group consisting of aluminosilicate molecular sieves, metal-substituted aluminosilicate molecular sieves, aluminophosphate (AlPO) molecular sieves, metal-substituted aluminophosphate (MeAlPO) molecular sieves, silico-aluminophosphate (SAPO) molecular sieves, and metal substituted silico-aluminophosphate (MeAPSO) molecular sieves, and mixtures thereof.

Any of the SCR catalysts can comprise a small pore molecular sieve selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SFW, SIV, THO, TSC, UEI, UFI, VNI, YUG, and ZON, and mixtures and/or intergrowths thereof. Preferably the small pore molecular sieve is selected from the group of Framework Types consisting of AEI, AFX, CHA, DDR, ERI, ITE, KFI, LEV and SFW.

Any of the SCR catalysts can comprise a medium pore molecular sieve selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, and WEN, and mixtures and/or intergrowths thereof. Preferably, the medium pore molecular sieve selected from the group of Framework Types consisting of FER, MFI, and STT.

Any of the SCR catalysts can comprise a large pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof. Preferably, the large pore molecular sieve is selected from the group of Framework Types consisting of BEA, MOR and OFF.

A metal exchanged molecular sieve can have at least one metal from one of the groups VB, VIB, VIIB, VIIIB, IB, or IIB of the periodic table deposited onto extra-framework sites on the external surface or within the channels, cavities, or cages of the molecular sieves. Metals may be in one of several forms, including, but not limited to, zero valent metal atoms or clusters, isolated cations, mononuclear or polynuclear oxycations, or as extended metal oxides. Preferably, the metals can be iron, copper, and mixtures or combinations thereof.

The metal can be combined with the zeolite using a mixture or a solution of the metal precursor in a suitable solvent. The term "metal precursor" means any compound or complex that can be dispersed on the zeolite to give a catalytically-active metal component. Preferably the solvent is water due to both economics and environmental aspects of using other solvents. When copper, a preferred metal is used, suitable complexes or compounds include, but are not limited to, anhydrous and hydrated copper sulfate, copper nitrate, copper acetate, copper acetylacetonate, copper oxide, copper hydroxide, and salts of copper amines (e.g. $[Cu(NH_3)_4]^{2+}$). This invention is not restricted to metal precursors of a particular type, composition, or purity. The molecular sieve can be added to the solution of the metal component to form a suspension, which is then allowed to react so that the metal component is distributed on the zeolite. The metal can be distributed in the pore channels as well as on the outer surface of the molecular sieve. The metal can be distributed in ionic form or as a metal oxide. For example, copper may be distributed as copper (II) ions, copper (I) ions, or as copper oxide. The molecular sieve containing the metal can be separated from the liquid phase of the suspension, washed, and dried. The resulting metal-containing molecular sieve can then be calcined to fix the metal in the molecular sieve. Preferably, one or more SCR catalysts comprise a Cu—SCR, an Fe—SCR, vanadium, a mixed oxide, promoted Ce—Zr or promoted $MnO_2$. A Cu—SCR catalyst comprises copper and a molecular sieve and an Fe—SCR catalyst comprises iron and a molecular sieve. Preferably the molecular sieve is an aluminosilicate, an aluminophosphate (AlPO), a silico-aluminophosphate (SAPO), or mixtures thereof. When the second SCR catalyst is between the ammonia slip catalyst and the second catalyst, the second SCR preferably comprises promoted Ce—Zr or promoted $MnO_2$.

A metal exchanged molecular sieve can contain in the range of about 0.10% and about 10% by weight of a group VB, VIB, VIIB, VIIIB, IB, or IIB metal located on extra framework sites on the external surface or within the channels, cavities, or cages of the molecular sieve. Preferably, the extra framework metal can be present in an amount of in the range of about 0.2% and about 5% by weight.

The metal exchanged molecular sieve can be a copper (Cu) or iron (Fe) supported molecular sieve having from about 0.1 wt. % to about 20 wt. % copper or iron of the total weight of the catalyst. More preferably copper or iron is present from a about 0.5 wt. % to about 15 wt. % of the total weight of the catalyst. Most preferably copper or iron is present from about 1 wt. % to about 9 wt. % of the total weight of the catalyst.

The catalysts described herein can be used in the SCR treatment of exhaust gases from various engines. One of the properties of a catalyst comprising a blend of platinum on a siliceous support with a first SCR catalyst, where the first SCR catalyst is a Cu—SCR or Fe—SCR catalyst, is that it can provide an improvement in $N_2$ yield from ammonia at a temperature from about 250° C. to about 350° C. compared to a catalyst comprising a comparable formulation in which the first SCR catalyst is present as a first layer and platinum is supported on a layer that stores ammonia is present in a second coating and gas comprising $NH_3$ passes through the first layer before passing through the second coating. Another property of a catalyst comprising a blend of platinum on a support with low ammonia storage with a first SCR catalyst, where the first SCR catalyst is a Cu—SCR catalyst or an Fe—SCR catalyst, is that it can provide reduced $N_2O$ formation from $NH_3$ compared to a catalyst comprising a comparable formulation in which the first SCR catalyst is present as a first layer and platinum supported on a support that stores ammonia is present in a second coating and gas comprising $NH_3$ passes through the first layer before passing through the second coating.

Figure 2:
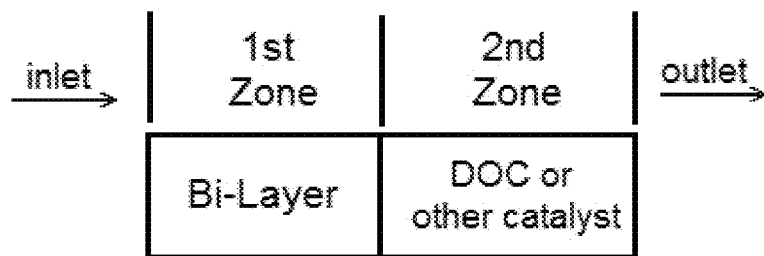
FIG. 2 depicts a configuration in which the ASC is a bi-layer and is positioned in the exhaust gas flow before a DOC or other catalyst. Depictions of the bi-layers are also shown.
Figure 3:
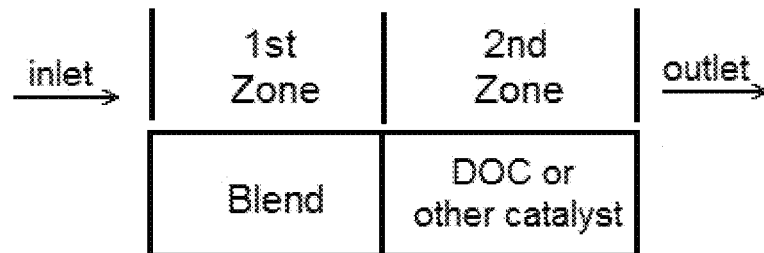
FIG. 3 depicts a configuration in which the ASC is a blend and is positioned in the exhaust gas flow before a DOC or other catalyst.

In a first configuration, a catalyst article comprises a substrate having an inlet and an outlet, a first zone comprising an ammonia slip catalyst (ASC) comprising (a) an ammonia oxidation catalyst comprising a PGM and a first SCR catalyst and a second zone comprising a diesel oxidation catalyst, a diesel exotherm catalyst (DEC), a NOx absorber, a selective catalytic reduction/passive NOx adsorber (SCR/PNA), a cold-start catalyst (CSC) or a three-way catalyst (TWC), where the first zone is located on the inlet side of the substrate and the second zone is located on the outlet side of the substrate. FIG. 1 depicts a configuration in which the ASC is positioned at the inlet of the article within the exhaust gas flow and the DOC or one of the other catalysts is positioned at the outlet of the article. The ammonia slip catalyst can be present in one of three Bi-layer configurations, as shown in FIG. 2. The ammonia slip catalyst can also be present as a blend of a platinum group metal (PGM) on a support with low ammonia storage and a first SCR catalyst, where the platinum group metal preferably comprises platinum, palladium or a mixture thereof, as shown in FIG. 3.

Figure 4:
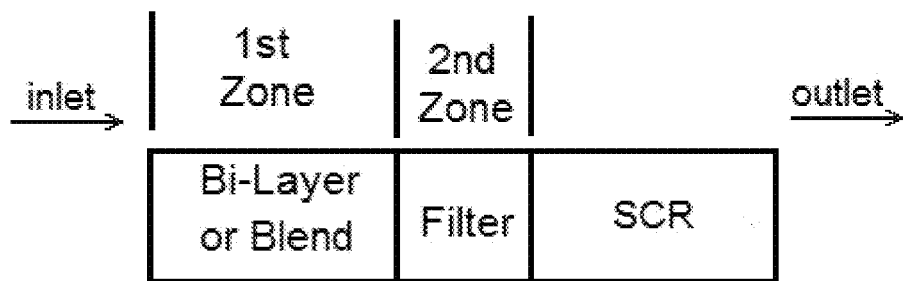
FIG. 4 depicts a configuration in which an ASC is positioned in the exhaust gas flow before a filter and a SCR is placed after the filter, where the ASC can be a bi-layer or a blend and the filter is coated on non-coated.
Figure 5:
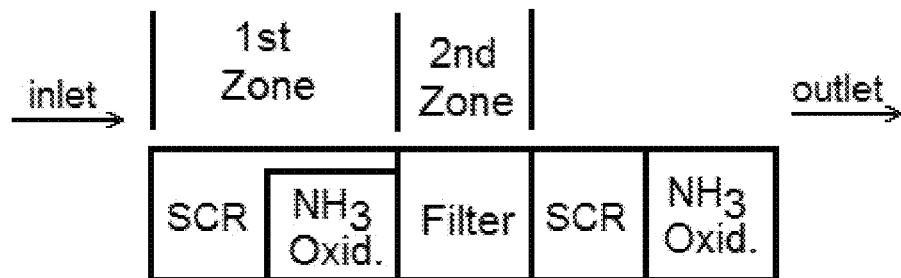
FIG. 5 depicts a configuration in which an ASC is positioned in the exhaust gas flow before and after a filter, where the ASC before the filter is a bi-layer with the SCR covering both the inlet side and the top of the ammonia oxidation catalyst, the ASC after the filter is a bi-layer with the SCR covering the inlet side of the ammonia oxidation catalyst the and the filter is coated on non-coated.
Figure 6:
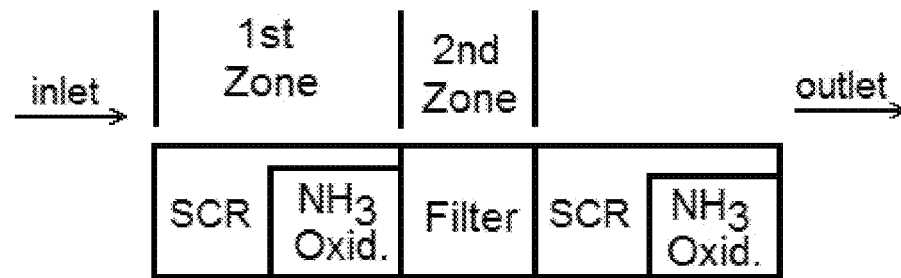
FIG. 6 depicts a configuration in which an ASC is positioned in the exhaust gas flow before and after a filter, where both ASCs are a bi-layer with the SCR covering both the inlet side and the top of the ammonia oxidation catalyst the and the filter is coated on non-coated.

In another configuration, a catalyst article comprises a substrate having an inlet and an outlet, a first zone comprising an ammonia slip catalyst (ASC) comprising (a) an ammonia oxidation catalyst comprising a PGM and a first SCR catalyst, a second zone comprising a coated or uncoated filter, followed by an SCR catalyst, as shown in FIG. 4. The ASC can be present as a bi-layer or a blend, as described above. FIG. 5 shows a configuration in which the ASC in the first zone is configured as a bi-layer in which the SCR catalyst covers the inlet side and the top of the ammonia oxidation catalyst and the ASC at the outlet is configured as a bi-layer in which the SCR catalyst covers the inlet side of the ammonia oxidation catalyst. FIG. 6 shows a configuration in which both ASCs are configured as a bi-layer in which the SCR catalyst covers the inlet side and the top of the ammonia oxidation catalyst and the ASC at the outlet is configured as a bi-layer in which the SCR catalyst covers the inlet side of the ammonia oxidation catalyst.

Figure 7:
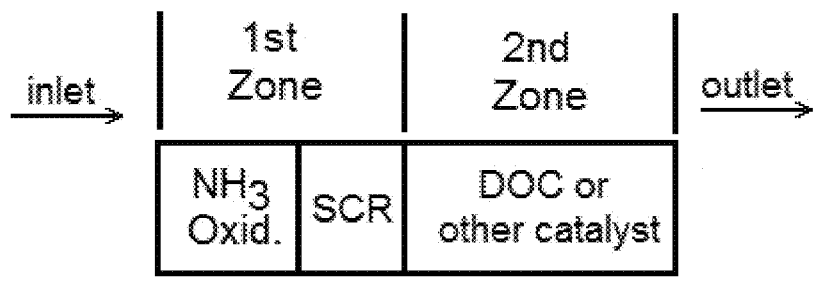
FIG. 7 depicts a configuration in which the ASC is positioned in the exhaust gas flow before a DOC or other catalyst and the ASC is a bi-layer with the ammonia slip catalyst on the inlet side of the SCR and the SCR is between the DOC or other catalyst.

FIG. 7 depicts a configuration in which the ASC is positioned in the exhaust gas flow before a DOC or another catalyst and the ASC is a bi-layer with the ammonia oxidation catalyst on the inlet side of the SCR and the SCR is between the DOC or another catalyst.

Figure 8:
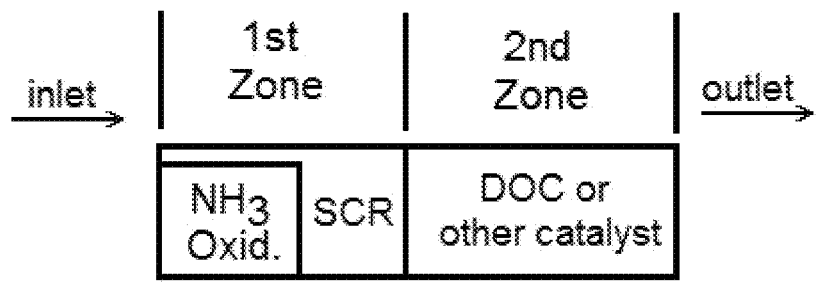
FIG. 8 depicts a configuration in which the ASC is positioned in the exhaust gas flow before a DOC or other catalyst and the ASC is a bi-layer with the ammonia slip catalyst on the inlet side of the SCR and a portion of the SCR covers the top of the ammonia oxidation catalyst and the SCR is between the DOC or other catalyst.

FIG. 8 depicts a configuration in which the ASC is positioned in the exhaust gas flow before a DOC or other catalyst and the ASC is a bi-layer with the ammonia slip catalyst on the inlet side of the SCR and a portion of the SCR covers the top of the ammonia oxidation catalyst and the SCR is between the DOC or other catalyst. Preferably the second SCR catalyst completely covers the first layer comprising a blend of platinum on a support with low ammonia storage with the first SCR catalyst.

Figure 9:
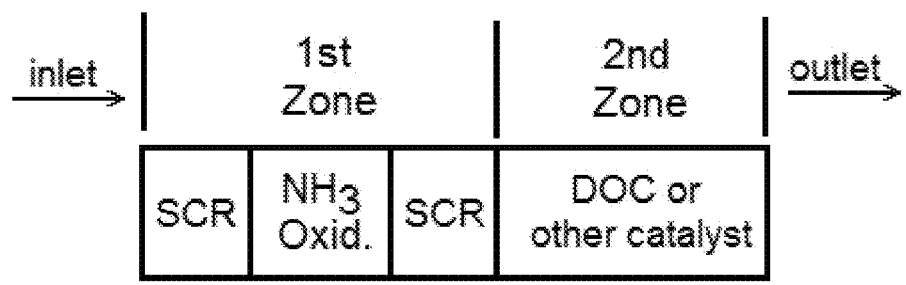
FIG. 9 depicts a configuration in which the ASC is positioned in the exhaust gas flow before an SCR catalyst that is upstream of a DOC or other catalyst, where the ASC is a bi-layer with the SCR catalyst before the ammonia oxidation catalyst. In other configurations, not shown, a portion of either the SCR catalyst in the ASC or the SCR between the ASC and the DOC or other catalyst, can cover the top of the ammonia oxidation layer.

FIG. 9 depicts a configuration in which the ASC is positioned in the exhaust gas flow before a second SCR catalyst that is upstream of a DOC or other catalyst, where the ASC is a bi-layer with the SCR catalyst before the ammonia oxidation catalyst. In other configurations, not shown, a portion of either the SCR catalyst in the ASC or the SCR between the ASC can cover the top of the ammonia oxidation layer.

In another configuration, the catalyst article comprises only one ammonia slip catalyst (ASC) and either (a) the second zone does not comprise a diesel oxidation catalyst (DOC) or (b) the DOC is not located adjacent to, and downstream of, the ammonia slip catalyst.

In another configuration, the catalyst article further comprises a third zone comprising an ASC catalyst, where the third zone is located between the first zone and the second zone. The PGM in the first zone can comprise palladium in an amount sufficient to generate an exotherm.

In each of the above configurations each of the zones can be located on the same substrate or there can be two or more substrates with one or more zones on each substrate. In an exhaust system, when two or more substrates are used, one or more substrates can be located in a single housing or casing or in different housings or casings.

The substrate for the catalyst may be any material typically used for preparing automotive catalysts that comprises a flow-through or filter structure, such as a honeycomb structure, an extruded support, a metallic substrate, or a SCRF. Preferably the substrate has a plurality of fine, parallel gas flow passages extending from an inlet to an outlet face of the substrate, such that passages are open to fluid flow. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The passages, which are essentially straight paths from their fluid inlet to their fluid outlet, are defined by walls onto which the SCR catalyst is coated as a "washcoat" so that the gases flowing through the passages contact the catalytic material. The flow passages of the monolithic substrate are thin-walled channels which can be of any suitable cross-sectional shape such as trapezoidal, rectangular, square, triangular, sinusoidal, hexagonal, oval, circular, etc. The invention is not limited to a particular substrate type, material, or geometry.

Ceramic substrates may be made of any suitable refractory material, such as cordierite, cordierite-α alumina, α-alumina, silicon carbide, silicon nitride, zirconia, mullite, spodumene, alumina-silica magnesia, zirconium silicate, sillimanite, magnesium silicates, zircon, petalite, aluminosilicates and mixtures thereof.

Wall flow substrates may also be formed of ceramic fiber composite materials, such as those formed from cordierite and silicon carbide. Such materials are able to withstand the environment, particularly high temperatures, encountered in treating the exhaust streams.

The substrates can be a high porosity substrate. The term "high porosity substrate" refers to a substrate having a porosity of between about 40% and about 80%. The high porosity substrate can have a porosity preferably of at least about 45%, more preferably of at least about 50%. The high porosity substrate can have a porosity preferably of less than about 75%, more preferably of less than about 70%. The term porosity, as used herein, refers to the total porosity, preferably as measured with mercury porosimetry.

Preferably, the substrate can be cordierite, a high porosity cordierite, a metallic substrate, an extruded SCR, a filter or an SCRF.

A washcoat comprising a blend of platinum on a siliceous support and a first SCR catalyst, where the first SCR catalyst is preferably a Cu—SCR catalyst or an Fe—SCR catalyst, can be applied to the inlet side of the substrate using a method known in the art. After application of the washcoat, the composition can be dried and optionally calcined. When the composition comprises a second SCR, the second SCR can be applied in a separate washcoat to either a dried or calcined article having the bottom layer, as described above. After the second washcoat is applied, it can be dried and calcined.

The substrate with the platinum containing layer can be dried and calcined at a temperature within the range of 300° C. to 1200° C., preferably 400° C. to 700° C., and more preferably 450° C. to 650° C. The calcination is preferably done under dry conditions, but it can also be performed hydrothermally, i.e., in the presence of some moisture content. Calcination can be performed for a time of between about 30 minutes and about 4 hours, preferably between about 30 minutes and about 2 hours, more preferably between about 30 minutes and about 1 hour.

An exhaust system can comprise a catalyst article of the first aspect of the invention and a means of introducing $NH_3$ into the exhaust gas or for forming $NH_3$ in the exhaust gas. In an exhaust system, when two or more substrates are used, one or more substrates can be located in a single housing or casing or in different housings or casings. The exhaust system can further comprise a catalysed soot filter (CSF). The catalysed soot filter comprises a high PGM loading in the front of the filter. A high PGM loading means a loading of from about 5 g/ft$^3$ to about 20 g/ft$^3$ (preferably about at least 5 g/Wt in heavy duty diesel engines and from about 10 g/ft$^3$ to about 20 g/ft$^3$ in light duty diesel engines) in about the front 5-50 mm of the filter.

An engine can comprise an exhaust system comprising a catalyst article of the first aspect of the invention and a means of introducing $NH_3$ into the exhaust gas or forming $NH_3$ in the exhaust gas. The engine can be a diesel engine on a vehicle, a diesel engine on a stationary source, or a diesel engine on a vessel, such as a ship.

In another aspect of the invention, a method of providing an exotherm in a catalyst comprises contacting an exhaust gas comprising a combustible gas, such a hydrocarbons, carbon monoxide (CO) or hydrogen, with the catalyst of the first aspect of the invention.

In another aspect of the invention, a method of reducing $N_2O$ formation from $NH_3$ in an exhaust gas comprises contacting an exhaust gas comprising ammonia with the catalytic article of the first aspect of the invention.

The following examples merely illustrate the invention; the skilled person will recognize many variations that are within the spirit of the invention and scope of the claims.

EXAMPLES

Example 1

Catalyst articles were prepared on a cordierite substrate (400 cpsi) by first placing a washcoat comprising a PGM on alumina on the substrate to form a bottom layer, then drying the washcoat. A top layer was placed on the bottom layer by applying a washcoat comprising copper chabazite (Cu-CHA) (120 g/ft$^3$ Cu), then drying the top layer. After the top layer had dried, the article was calcined.

A reference catalyst article was prepared containing only platinum as the PGM at a loading of 3 g/ft$^3$. A sample comprising Pt and Pd as the PGM was prepared with a total PGM loading of 18 g/ft$^3$, with a Pt:Pd at ratio of 1:5. A sample comprising Pt and Pd as the PGM was prepared with a total PGM loading of 18 g/ft$^3$, with a Pt:Pd at ratio of 2:1.

The samples were tested fresh and after hydrothermal ageing at 580° C. for 100 hours.

1"×1" core of the samples first had $N_2$ gas passed over them as the temperature increased from room temperature to 150° C. Then gas containing $NH_3$=500 ppm, $CO_2$=4.5%, $H_2O$=5%, CO=200 ppm, $O_2$=12%, with the balance being $N_2$, was over the samples at SV=150000 h$^{-1}$, while the temperature increased from 150° C. to 500° C. at a rate of 10° C./minute. The concentrations of $NH_3$, NOx, $N_2O$, CO and $CO_2$ were measured by FTIR at the outlet from the system.

FIGS. 10 and 11 show $NH_3$ conversion, $N_2O$ selectivity and NOx selectivity from the three samples from 200° C. to 500° C. in fresh and aged samples. The catalyst with Pt and Pd in a 2:1 ratio provided better low temperature $NH_3$ conversion than the reference with only Pt, while the catalyst with Pt and Pd in a 1:5 ratio provided less $NH_3$ conversion below about 350° C. The catalyst with Pt and Pd in a 2:1 ratio provided higher $N_2O$ selectivity than either the reference with only Pt or the catalyst with Pt and Pd in a 1:5 ratio. The three catalysts provided similar NOx selectivity. These results apply to both fresh and aged samples.

FIGS. 12 and 13 show NO conversions from the three samples from 150° C. to 500° C. in fresh and aged samples. Again, fresh and aged samples provided similar results, with the 2:1 mixture of Pt:Pd providing conversion equal to or greater than the reference with only Pt as the PGM.

FIGS. 14 and 15 show CO conversions from the three samples from 150° C. to 500° C. in fresh and aged samples. Again, fresh and aged samples provided similar results, with the 2:1 mixture of Pt:Pd providing conversion equal to or greater than the reference with only Pt as the PGM, with the 2:1 mixture of Pt:Pd providing conversion equal to or greater than the reference with only Pt as the PGM.

FIGS. 16-18 and 19-21 show HC conversions from the three samples from 150° C. to 500° C. in fresh and aged samples, respectively. Again, fresh and aged samples provided similar results. The reference samples, which only contain Pt as the PGM, had a maximum HC conversion of about 70% at about 450° C. to 500° C. However, both samples containing mixtures of Pt and Pd provided about 70% HC conversion by about 375° C. and 90% or greater HC conversion by 500° C. This demonstrates that a mixture of Pt and Pd in an ASC is able to oxidize much more hydrocarbons than from the use of Pt alone.

Example 2

Samples of catalysts prepared as describe in Example 1 were placed in an exhaust system along with a diesel oxidation catalyst (DOC) and a catalysed soot filter (CSF). The catalysts were placed in the exhaust system in the order SCR:ASC:DOC:CSF. The exhaust system was connected to engine and urea was injected into the exhaust stream before the SCR catalyst. The outlet from a fuel injector was also located in the system before the SCR. The system was conditioned by running the engine for 1 hour at 450° C., and then the engine speed was reduced to allow the engine temperature to stabilize at about 300° C. After the temperature stabilized, fuel was injected into the exhaust system before the SCR catalyst to raise the temperature after the CSF to about 450° C. After maintaining the temperature after the CSF constant for about 15 minutes, the addition of fuel into the exhaust system was stopped and the temperature was allow to return to about 300° C.

Figure 22:
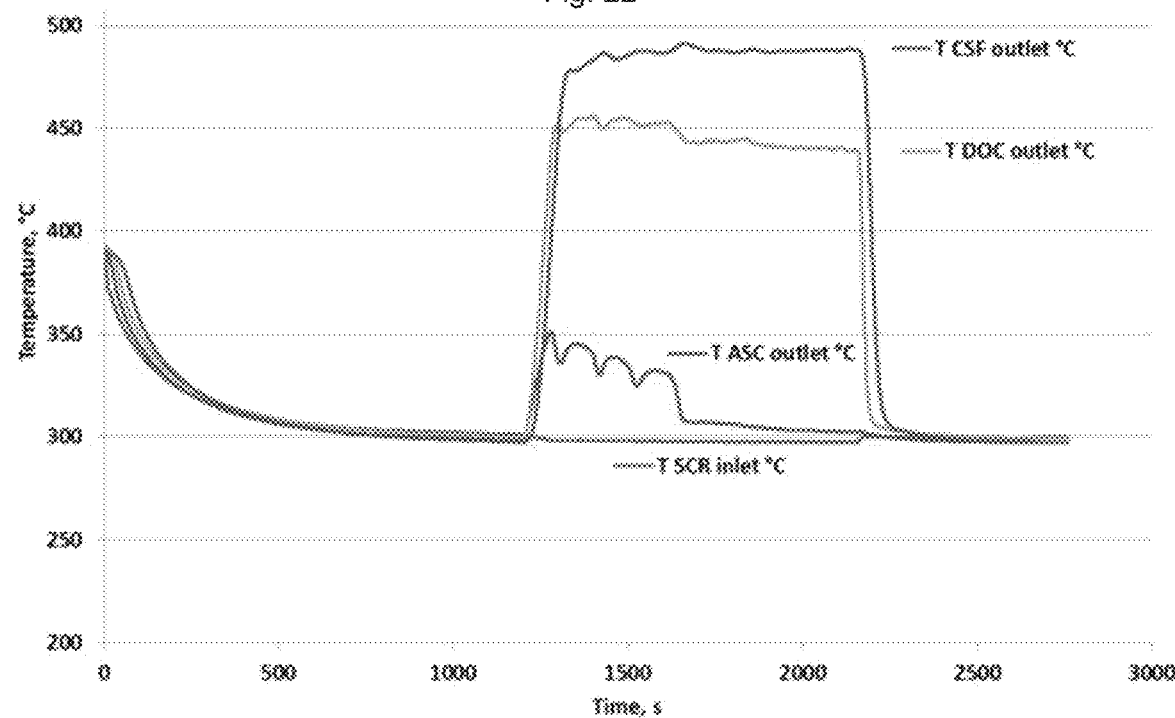
FIG. 22 is a graph showing the temperature at various points in an exhaust system containing a reference catalyst with Pt as the only PGM.
Figure 23:
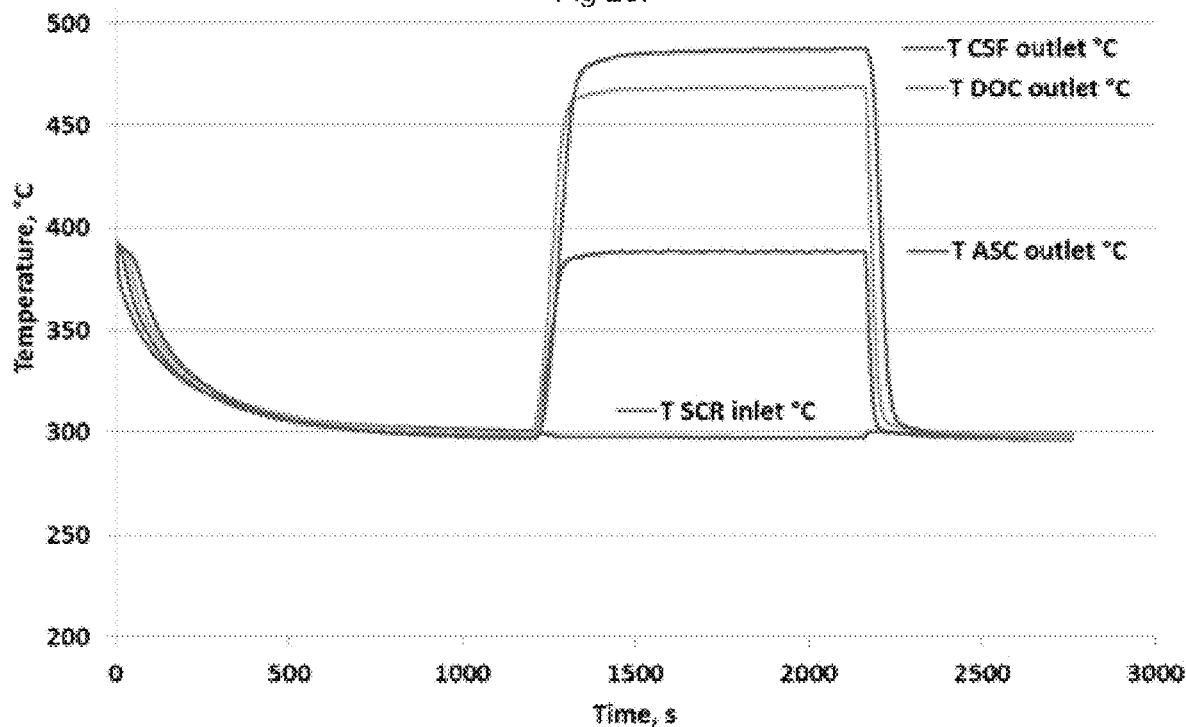
FIG. 23 is a graph showing the temperature at various points in an exhaust system containing a reference catalyst with Pt and Pd in a 1:5 loading.

The temperatures at the inlet to the SCR, and the outlets from the ASC, DOC and CSF were measured. These temperature are shown in FIG. 22-24 for the reference contain Pt only, the catalyst with 18 g/ft³ of PGM with a 1:5 Pt:Pd loading, and the catalyst with 18 g/ft³ of PGM with a 2:1 Pt:Pd loading, respectively. FIG. 22 shows that the use of a catalyst containing only Pt as the PGM resulted in the outlet temperature at the ASC reaching a maximum of about 350° C. at about 1250 sec, then dropping to about 300° C. by about 1600 sec. However, in both of the system using a combination of Pt and Pd, the outlet temperature in at the ASC reached a maximum of about 390° C. at about 1250 sec and the temperature remained at about 390° C. by until about 2200 sec, indicating that both of these catalysts generated an exotherm. This stable exotherm was not observed in the reference catalyst containing only Pt as the PGM. This demonstrates that when using an SCR before an ASC, the SCR did not generate a stable exotherm. These results also show that the catalyst articles described herein are able to provide better exotherms than provided by the reference system.

The generation of an exotherm can heat the catalyst to a temperature where a catalyst, such as a Cu SCR catalyst, can undergo sulphur regenerated or where the SCR reaction efficiency is increased, leading to better performance in low load operations or in cold starts. When the ASC is first in the system, the generation of an exotherm can allow the catalyst to regenerate itself.

The presence of a PGM in the catalyst will reduce the risk of highly exothermal reactions in the catalytic system caused by the oxidation of hydrocarbons or other reactive species that can accumulate on a catalyst and be released and combusted during events that result in increased exhaust gas temperatures.

Example 3—Creation of an Exotherm on the ASC

An ammonia slip catalyst described above is placed first in an exhaust after-treatment system. In a conventional system, an SCR catalyst would be placed in this position, as shown in Example 2. Alternatively, the ammonia slip catalyst is placed in a position such that an exotherm is not be generated upstream of the ammonia slip catalyst.

The generation of an exotherm can heat the catalyst to a temperature where a catalyst, such as a Cu SCR catalyst, can undergo sulphur regenerated or where the SCR reaction efficiency is increased, leading to better performance in low load operations or in cold starts. When the ASC is first in the system, the generation of an exotherm can allow the catalyst to regenerate itself.

The presence of a PGM in the catalyst will reduce the risk of highly exothermal reactions in the catalytic system caused by the oxidation of hydrocarbons or other reactive species that can accumulate on a catalyst and be released and combusted during events that result in increased exhaust gas temperatures. By having a platinum group metal incorporated into the catalyst, an exotherm can be generated by reacting hydrocarbons injected either directly into the exhaust line or coming from the engine onto the ASC itself. The exotherm generated can heat up the catalyst to a temperature where a catalyst, such as a Cu SCR catalyst, can undergo sulphur regenerated or where the SCR reaction efficiency is increased leading to better performance in low load operations or in cold starts. The use of Pd as a PGM is particularly useful because of its good performance in exotherm generation and relatively poor ammonia oxidation properties.

Example 4: System Less Sensitive to HC Storage

The ammonia slip catalyst is placed either first in the exhaust after-treatment system or in a position that large amounts of hydrocarbons reach the ammonia slip catalyst. The invention is compared with a conventional system design where an SCR catalyst would be placed in the same position instead.

The storage of large amounts of hydrocarbons, combined with a fast release of the hydrocarbons as the system heats up, can result in a large exotherm that can result in very high temperatures in the catalyst. These very high can deactivate the catalyst. In some cases, the large exotherm produced can even melt the catalyst. The presence of a PGM can reduce the risk of the formation of a very large exotherm by burning off the hydrocarbons before they can be present at a level to cause the very high exotherm. By having a platinum group metal incorporated into the catalyst, many of the hydrocarbons reaching the catalyst will be oxidized rather than becoming trapped within an SCR catalyst framework, as commonly occurs. This will reduce the risk for runaway exothermal events where trapped hydrocarbons react and suddenly cause very high temperatures that deactivate exhaust gas after-treatment systems.

Example 5: System with Very Good Slip Control

The ammonia slip catalyst is placed after the injection point of urea (or other $NH_3$ source). In a conventional system, an SCR catalyst would be placed in this position.

By placing the ASC very early in the system, the control of the ammonia injection will be easier because of the reduced risk for ammonia slip. This is especially useful if the size of the catalyst is very limited as can be the case if the ammonia slip catalyst is placed upstream of a conventional SCRT or CCRT system. This system can reduce $N_2O$ formation. Ammonia can react on a DOC or CSF to form $N_2O$. By minimizing ammonia slip, the amount of $N_2O$ that can be formed by reaction of ammonia on a DOC or a CSF is also reduced.

The benefits of this system are that: (1) over dosage of $NH_3$ is possible, (2) a less stringent dosing strategy is needed, and (3) there is less formation of $N_2O$ on downstream components by slipping $NH_3$ (on DOC or CSF).

Example 6: Incorporation of the PGM into the SCR Catalyst

For each of the examples above, the ASC is a single layer catalyst that is a mixture of the PGM with the SCR catalyst rather than a bi-layer catalyst with a bottom layer comprising a platinum group metal and a top layer comprising a first SCR catalyst.

The use of the mixture of the two catalysts reduces the backpressure in the system as well as reducing production cost. Preferably, the ammonia slip catalyst comprises a blend of platinum on a support with low ammonia storage and SCR catalyst.

The catalyst article described herein are especially useful during cold start, where the temperature is lower than that generally needed for the PGM to oxidize ammonia and reduce the SCR activity of the system. For example, Pd oxidation of ammonia generally does not become important until a temperature of about 400° C., with is above typical cold start temperatures.

The preceding examples are intended only as illustrations; the following claims define the scope of the invention.

We claim:

1. A method of treating an exhaust gas, comprising contacting the exhaust gas with a catalyst article comprising a substrate comprising an inlet end and an outlet end, a first zone and a second zone, where the first zone comprises an ammonia slip catalyst (ASC) comprising a platinum group metal and a first SCR catalyst comprising a metal exchange molecular sieve, vanadium or a base metal, and the second zone comprises a second catalyst selected from the group consisting of a diesel oxidation catalyst (DOC), a diesel exotherm catalyst (DEC), a catalyzed soot filter (CSF), a NOx absorber, a selective catalytic reduction/passive NOx adsorber (SCR/PNA), a cold-start catalyst (CSC) or a three-way catalyst (TWC), where the first zone is located upstream of the gas flow relative to the second zone, and where the first zone and the second zone are located on the same substrate and the first zone is located on the inlet side of the substrate and the second zone is located on the outlet side of the substrate.

2. The method of claim 1, where the ammonia slip catalyst comprises a bottom layer comprising a platinum group metal and a top layer comprising the first SCR catalyst located over the bottom layer.

3. The method of claim 1, where the ammonia slip catalyst comprises a blend of a platinum group metal on a support with low ammonia storage and a first SCR catalyst.

4. The method of claim 1, where the second zone comprises a blend of a diesel oxidation catalyst and a second SCR catalyst.

5. The method of claim 1, further comprising a second SCR catalyst, where the second SCR catalyst is located between the ammonia slip catalyst and the second catalyst.

6. The method of claim 1, where the platinum group metal comprises platinum, palladium or a combination of platinum and palladium.

7. The method of claim 1, where the platinum group metal is on a support with low ammonia storage.

8. The method of claim 1, where platinum is present from at least one of: (a) 0.01-0.3 wt. %, (b) 0.03-0.2 wt. %, (c) 0.05-0.17 wt. %, and (d) 0.07-0.15 wt. %, inclusive, relative to the weight of a support of platinum+the weight of platinum+the weight of the first SCR catalyst in the blend.

9. The method of claim 5, where the second SCR catalyst is a base metal, an oxide of a base metal, a molecular sieve, a metal exchanged molecular sieve or a mixture thereof.

10. The method of claim 9, where the molecular sieve or the metal exchanged molecular sieve is small pore, medium pore, large pore or a mixture thereof.

11. The method of claim 1, where the article does not include an additional ammonia slip catalyst (ASC) and either (a) the second zone does not comprise a diesel oxidation catalyst (DOC) or (b) the DOC is not located adjacent to, and downstream of, the ammonia slip catalyst.

12. The method of claim 1, further comprising a third zone comprising an ASC catalyst, where the third zone is located between the first zone and the second zone.

13. The method of claim 12, where the PGM in the first zone comprises palladium in an amount of about 1 g/ft³ to about 20 g/ft³.

14. An exhaust system comprising
a. a catalyst article comprising a substrate comprising an inlet end and an outlet end, a first zone and a second zone, where the first zone comprises an ammonia slip catalyst (ASC) comprising a platinum group metal and a first SCR catalyst comprising a metal exchange molecular sieve, vanadium or a base metal, and the second zone comprises a second catalyst selected from the group consisting of a diesel oxidation catalyst (DOC), a diesel exotherm catalyst (DEC), a catalyzed soot filter (CSF), a NOx absorber, a selective catalytic reduction/passive NOx adsorber (SCR/PNA), a cold-start catalyst (CSC) or a three-way catalyst (TWC), where the first zone is located upstream of the gas flow relative to the second zone, and where the first zone and the second zone are located on the same substrate and the first zone is located on the inlet side of the substrate and the second zone is located on the outlet side of the substrate; and b. a means of introducing $NH_3$ into the exhaust gas or forming $NH_3$ in the exhaust gas.

15. The exhaust system of claim 14, further comprising a catalysed soot filter (CSF).

16. The exhaust system of claim 15, where the catalysed soot filter comprises a PGM loading from about 5 g/ft$^3$ to about 20 g/ft$^3$ in the inlet side of the filter.

* * * * *